United States Patent [19]

Eschwey et al.

[11] 4,259,219
[45] Mar. 31, 1981

[54] WATER-DILUTABLE LACQUERS AND THEIR USE IN BAKED COATINGS

[75] Inventors: Helmut Eschwey; Manfred Gorzinski, both of Düsseldorf, Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 77,307

[22] Filed: Sep. 20, 1979

[30] Foreign Application Priority Data

Oct. 19, 1978 [DE] Fed. Rep. of Germany ....... 2845539

[51] Int. Cl.³ .................... C09D 3/64; C09D 3/80
[52] U.S. Cl. .................... 260/22 A; 260/22 CQ; 260/29.2 N; 260/29.2 E; 260/29.6 MN; 427/384; 428/430; 428/441, 427/374.1; 427/385.5

[58] Field of Search .......... 260/22 A, 22 CQ, 29.2 E, 260/29.2 N, 29.6 MN; 427/374 R, 384, 385 R; 428/430, 441

[56] References Cited

U.S. PATENT DOCUMENTS

| | | | |
|---|---|---|---|
| 3,266,971 | 8/1966 | Miller | 260/29.6 MN |
| 3,428,586 | 2/1969 | Coats | 260/29.6 MN |
| 3,661,827 | 5/1972 | Taft | 260/29.6 MN |
| 4,171,293 | 10/1979 | Eschwey et al. | 260/29.2 E |

*Primary Examiner*—Ronald W. Griffin
*Attorney, Agent, or Firm*—Hammond & Littell, Weissenberger and Muserlian

[57] ABSTRACT

A water-dilutable lacquer based on an alkyd or acrylate resin containing carboxyl groups, which have been neutralized with an amine containing at least one 2,3-dihydroxy propyl group per amine nitrogen. The lacquers according to the invention are particularly suitable for use in the production of baked coatings on thermostable substrates, metal sheets, or-shaped metal parts.

8 Claims, No Drawings

WATER-DILUTABLE LACQUERS AND THEIR USE IN BAKED COATINGS

FIELD OF THE INVENTION

This invention is directed to water-dilutable lacquers. More specifically, this invention is directed to water-dilutable lacquers based on alkyd or acrylate resins containing carboxyl groups which have been neutralized with amines, and their use in preparing baked coatings on thermally stable substrates.

BACKGROUND OF THE INVENTION

Volatile amines such as dimethyl aminoethanol, ethyl aminoethanol, isopropyl aminoethanol, 2-dimethylamino-2-methyl propanol, 2-amino-2-methyl propanol, and others, as well as ammonia, have for many years been used for neutralizing and solubilizing water-dilutable lacquer binders. Whereas ammonia evaporates to a considerable extent from such aqueous lacquer systems at room temperature, so that the lacquers thicken and eventually coagulate, the above-mentioned amono alcohols are relatively non-volatile at room temperature since their vapor pressure at 20° C. is only from about 1 to 5 torr. They therefore ensure good stability of the lacquers in storage.

At higher temperatures, in particular at the baking or stoving temperatures of from about 120° to 175° C. normally employed for lacquers dried in an oven, the aforesaid amines evaporate more or less completely from the lacquer films at temperatures in the range of about 135° to 165° C., depending on the boiling points of the amines, and enter the atmosphere.

Since new lacquer systems requiring progressively smaller proportions of auxiliary solvents have been developed in recent years and the first completely solvent-free aqueous lacquers have already been tested, the use of volatile amines would appear to be particularly unsatisfactory in that they pollute the atmosphere.

In spite of this well known disadvantage, the volatility of the neutralizing agent has hitherto been demanded as an essential precondition for good film quality. Sensitivity to water, a tendency to re-emulsify, insufficient gloss, yellowing, and disturbances in the flow of the lacquers are frequently attributed to insufficient volatility of the amine used.

OBJECTS OF THE INVENTION

It is therefore an object of the present invention to provide neutralizing agents which are suitable for water compatible lacquer resins containing carboxyl groups and which do not contaminate the atmosphere during baking of the resins and at the same time do not have a deleterious effect on the quality of the baked film.

It is also an object of the present invention to provide suitable water-dilutable lacquers based on alkyd or acrylate resins.

It is further an object of the present invention to provide for the use of such water-dilutable lacquers in the preparation of baked coatings.

These and other objects of the invention will become more apparent in the discussion below.

DESCRIPTION OF THE INVENTION

It has now surprisingly been found that the problem of providing suitable lacquer systems can be reduced or substantially solved by neutralizing the carboxyl groups of the alkyd or acrylate resins with amines containing at least one 2,3-dihydroxy propyl group per amine nitrogen. The neutralizing agents preferably contain from one to three 2,3-dihydroxy propyl groups per amine nitrogen or up to five 2,3-dihydroxy propyl groups where said groups are condensed with another 2,3-dihydroxy propyl group. These amines, which preferably have at least one but not more than four amine nitrogen atoms per molecule, should have a molecular weight in the range of from 91 to about 600. The amines containing 2,3-dihydroxy propyl groups according to the invention in most cases also contain alkyl groups or aryl groups with a total of from about 2 to about 18 carbon atoms and possibly also hydroxyl and/or ether groups in the molecule.

Because of the 2,3-dihydroxyl groups which are present according to the invention, the amines are regarded as thermally reactive lacquer components and become a constituent of the lacquer film during baking. No significant quantities of amine are given off into the atmosphere at baking temperatures of up to 180° C., or in the case of certain amines, even above this temperature.

In contrast to other relatively non-volatile amines, such as, for example, dodecylamine, which result in lacquer films which are sensitive to water, or triethanolamine and its ethylene oxide adducts, which result in lacquer films which have a considerable tendency to yellow, the 2,3-dihydroxy propylamines lead to lacquer films which are resistant to water, have little or no tendency to yellow, and have a good gloss and smooth levelling flow.

The 2,3-dihydroxy propylamines, which are virtually non-volatile, have boiling points above 200° C. at normal pressure. Their vapor pressure is below 0.1 torr at 20° C., below 10 torr at 100° C., and below 100 torr at 150° C. The freedom of 2,3-dihydroxy propylamines from any odor and their high flash points, which are in the region of about 190° to 290° C., are other important advantages for their use according to the invention. In this connection, it should be noted that the amines hitherto used in the art have flash points in the region of about 30° to 90° C.

One advantage of the use of 2,3-dihydroxy propylamines which should be particularly mentioned is their solubilizing effect. This makes it possible for the auxiliary solvent content to be kept low. In addition, the use of 2,3-dihydroxy propylamines renders water-dilutable even those lacquer binders which, because of their low acid number, cannot be solubilized by known amines. Furthermore, 2,3-dihydroxy propylamines make it possible for neutral acqueous lacquers (pH=6–7.5) to be formulated. This ensures hydrolytic stability, particularly of alkyd resins, over a considerable period of time.

The dihydroxy propylamines to be used according to the invention may be derived from ammonia, primary and secondary amines, alkanolamines, and tertiary alkanolamines. The following are examples of suitable amines: n-propylamine, i-propylamine, the isomeric butylamines, neopentylamine, hexylamines, octylamine, hydroxy propylamine, diethanolamine, ethylene diamine, dimethylamino propanol, tripropanolamine, diethylene triamine, trihydroxy methylamino methane, 2-amino-2-methyl propanol, 2-dimethylamino ethanol, methyl amino propanol, dodecylamine, N-hydroxy ethyl ethylene diamine, p-amino phenoxy ethanol, and 12-hydroxy octadecanamine. The 2,3-dihydroxy propyl derivatives are obtained in known manner by the addition of glycidol, epichlorohydrin, or glycerol monochlorohydrin to the amino or hydroxyl function, as described in, for example, German Pat. No. 107,510, incorporated herein by reference.

The 2,3-dihydroxy propylamines are preferably synthesized by the addition of glycidol, as described by W. M. Weigert, A. Kleeman, and G. Schreyer, *Chemiker-Zietung*, 99/1 (1975), 19–25, incorporated herein by reference.

From two to ten hydroxyl groups are required to produce the desired thermal reactivity. The addition of one mol of glycidol to one amine function introduces two hydroxyl groups while its addition to one hydroxyl group increases the number of hydroxyl groups by one.

The lower limit of the molecular weight range of the dihydroxy propylamines to be used according to the invention is 91 (ammonia-1-glycidol adduct molecular weight=91, methylamine-1-glycidol adduct molecular weight=105, dimethylamine-1-glycidol adduct molecular weight=119). The boiling points of these amines at normal pressure are 265° C., 240° C., and 220° C., respectively. Their vapor pressures are ~0.01, ~0.05, and ~0.1 torr, respectively, at 20° C. and ~20, ~45, and ~85 torr, respectively, at 150° C.

The upper limit of about 600 for the molecular weight range is determined by economic considerations since the quantity of amine required to neutralize the acid groups is directly proportional to the molecular weight of the amine. Even if the amine becomes a constituent of the lacquer film upon baking, it should not constitute too high a proportion of the binder. A summary of suitable 2,3-dihydroxy propylamines is given below. For the sake of simplicity, they have been characterized by their preparation as "glycidol adduct".

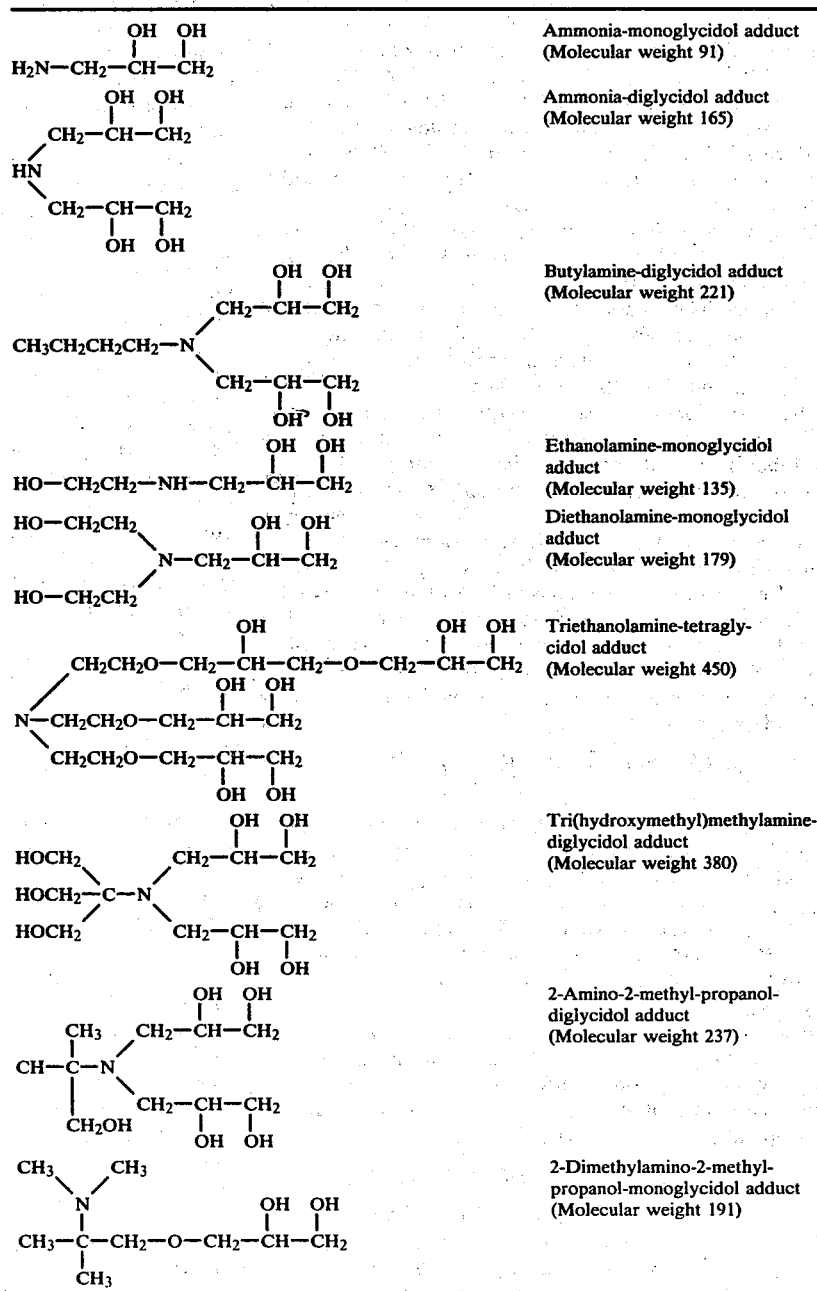

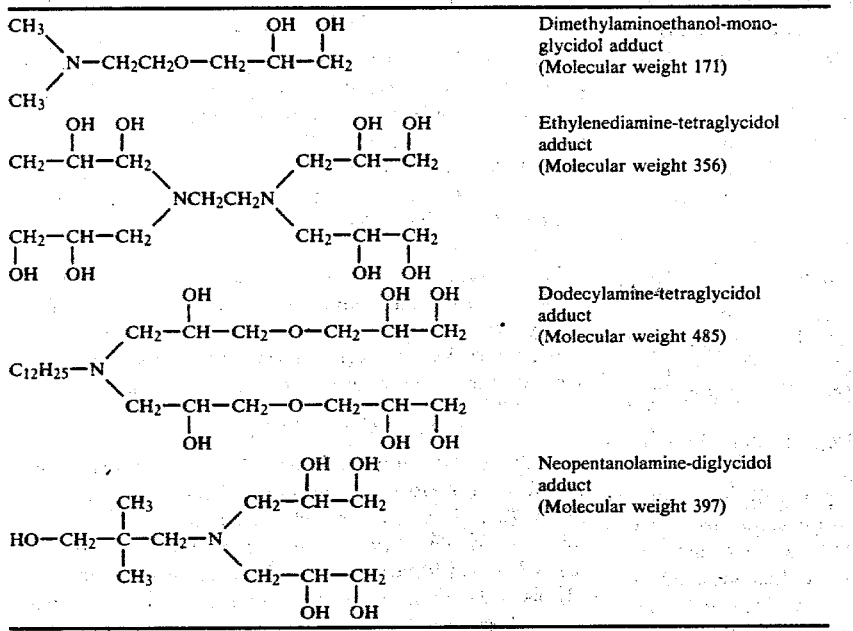

In the table below, the boiling points, flash points, and pH of 0.1 N aqueous solutions are summarized. The weight loss after 30 minutes in a circulating air drying cupboard at 150° C. was in all cases below 0.5%, whereas that of the comparison amines was 100%.

TABLE 1

| Neutralizers | Boiling Point (°C.) | Flash Point DIN 51376 (°C.) | pH 0.1 N Aqueous Solution |
|---|---|---|---|
| Dihydroxy propylamines: | | | |
| Ethanolamine-monoglycidol adduct | 295 | 190 | 9.9 |
| Diethanolamine-monoglycidol adduct | 320 | 234 | 9.6 |
| Ethanolamine-diglycidol adduct | >350 | 272 | 9.2 |
| Tri(hydroxymethyl)methylamine diglycidol adduct | >350 | 217 | 8.4 |
| Butylamine-diglycidol adduct | >350 | 224 | 9.2 |
| Diethanolamine-diglycidol adduct | >350 | 266 | 9.1 |
| Dodecylamine-tetraglycidol adduct | >350 | 266 | 9.8 |
| 2-Amino-2-methyl propanol-diglycidol adduct | >350 | 236 | 9.3 |
| Comparison amines: | | | |
| Dimethylaminoethanol | 135 | 38 | 10.1 |
| Diethylaminoethanol | 163 | 46 | 10.3 |
| 2-Amino-2-methylpropanol | 165 | 77.5 | 10.2 |
| 2-N,N-dimethylamino-2-methylpropanol | 160 | 63 | 10.6 |

The purpose for which the 2,3-dihydroxy propylamines are to be used according to the invention covers the neutralization, pH regulation, and pH stabilization in general of water-dilutable lacquer binders, functions which have heretofore been carried out by means of volatile amines or other neutralizing agents. Examples of substances in which they are used include synthetic resin dispersions, water soluble printing inks, and water soluble styrene-maleic acid anhydride resins. In particular, the use according to the invention of the dihydroxy propylamines described above is applicable to the neutralization of water-dilutable acrylate and alkyd resin lacquer binders which are oven-dried. These lacquer binders have acid numbers ranging from about 5 to 120, in particular from about 15 to 80.

These binders are acrylic polymers of acrylic and/or methacrylic esters containing carboxyl groups as well as of acrylic and/or methacrylic acid and possibly other modifying co-monomers.

The term "alkyd resins" is used here to describe polycondensates of polyfunctional alcohols and polyfunctional carboxylic acids which may be modified with monohydric alcohols and/or monobasic carboxylic acids, such as natural fatty acids. To obtain bakable water-dilutable alkyd resins, it is particularly suitable to use oil-free, short or medium oil alkyd resins, i.e., polycondensates having solids contents of up to about 55% by weight.

EXAMPLES

The following examples illustrate the invention and are not to be construed as limiting the invention thereto.

Preparation of the acid resins (A) Alkyd resin

Four hundred grams of a coconut oil fatty acid (chain length distribution: 1% $C_6$, 6% $C_8$, 6% $C_{10}$, 48% $C_{12}$, 18% $C_{14}$, 10% $C_{16}$, and 11% $C_{18}$), 209 of phthalic acid anhydride, 126 g of adipic acid, and 265 g of pentaerythritol were azeotropically polycondensed to an acid number of 57 at 200° C. and diluted to a solids content of 85% with ethylene glycol monobutyl ether. A similar reaction mixture was again prepared but the reaction was continued to an acid number of 44.5. Ethylene glycol monobutyl ether was then added, and the mixture was adjusted to a solids content of 85%.

(B) Acrylate resin

Three hundred thirty-three grams of ethylene glycol monobutyl ether were introduced into a 2 liter triple-necked, round bottomed flask equipped with stirrer, reflux condenser, thermometer, and dropping funnel, and 408 g of methyl methacrylate, 408 g of butyl acrylate, 100 g of hydroxy ethyl methacrylate, 84 g of acrylic acid, and 12 g of azo-bis-isobutyric acid dinitrile (AIBN) dissolved therein were added dropwise at 100° C. over a period of 2.5 hours.

The reaction was left to continue for 1 hour at 100° C. with the addition of a further 4 g of AIBN, and a water dilutable acrylic polymer having an acid number of 62 was obtained. The solids content was 75% by weight.

EXAMPLE 1

Portions of the alkyd resin solution with acid number 57 were neutralized with one of the following:
(a) bis-(2,3-dihydroxypropyl)-butylamine;
(b) bis-(hydroxyethyl)-2,3-dihydroxypropylamine;
(c) N,N'-tris-(2,3-dihydroxypropyl)-ethylenediamine; or
(d) bis-(2,3-dihydroxypropyl)-hydroxy-tertiary butylamine.

The hexamethyl ether of hexamethylol melamine (HMMM) was added to the resulting solutions in an amount of 3 parts by weight of HMMM to 7 parts by weight of the resin. The solutions were then adjusted to a solids content of 50% by the addition of water. Clear lacquer film coatings were applied to glass plates, which were then baked in a circulating air drying cupboard for 30 minutes at 150° C. The thickness of the dried films was 50/μm.

The films, all of which had high gloss, were subjected to a water test by immersing the samples in distilled water at 40° C. and then assessing them at given time intervals in accordance with the following system of marking:

+: Film unchanged
0: small bubbles begin to form at the edge
1: slight formation of small bubbles (<1 mm) over the whole surface
2: marked formation of small bubbles (~1 mm) over the whole surface
3: severe formation of bubbles (~2-5 mm) over the whole surface
a: film becomes detached from its glass substrate.

The pendulum hardness was also assessed according to DIN 53 157.

The results of the testing are summarized in the following table:

TABLE 2

| Example | Pendulum Hardness (sec) | Water Test at 40° C. | | | | | | | | |
|---|---|---|---|---|---|---|---|---|---|---|
| | | 1h | 2h | 3h | 4h | 5h | 10h | 24h | 30h | 90h |
| 1 (a) | 103 | + | + | + | + | + | + | 1 | 1-2 | 2 |
| 1 (b) | 101 | + | + | + | + | + | + | 0 | 0 | 1-2 |
| 1 (c) | 103 | + | + | + | + | + | + | 0-1 | 1 | 2 |
| 1 (d) | 105 | + | + | + | + | + | + | + | + | 0 |

Comparison

A lacquer in which the carboxyl groups were neutralized with dimethyl aminoethanol was prepared in place of the lacquer according to the invention. The procedure was otherwise identical to that described above.

Although the films were glossy and had a pendulum hardness of 98 seconds, severe bubble formation (mark 3) was observed after 30 hours and detachment from the substrate (mark a) was observed after 90 hours in the water test.

EXAMPLE 2

Example 1 was repeated using an alkyd resin with acid number 44.5 and bis(2,3-dihydroxy propyl)-butylamine as neutralizer. The result obtained in the test for pendulum hardness was 102 seconds. In the water test, slight formation of small bubbles (mark 1) was observed after 30 hours and bubble formation became distinct after 90 hours (mark 2).

Comparison

When dimethylamino ethanol was used for neutralization instead of the amino mentioned above, the capacity for dilution with water was insufficient. A cloudy, streaky solution was obtained, which solution separated into two phases within seven days.

EXAMPLE 3

Portions of a solution of acrylate resin with acid number 62 were neutralized with one of the following:
(a) bis-(2,3-dihydroxy propyl)-butylamine,
(b) bis-(hydroxy ethyl)-2,3-dihydroxy propylamine,
(c) N,N'-tris-(dihydroxy propyl)-ethylene diamine, or
(d) bis-(2,3-dihydroxy propyl)-hydroxy-tertiary butylamine.

The hexamethyl ether of hexamethylol melamine (HMMM) was added to the resulting solutions in amounts corresponding to 3 parts by weight of HMMM to 10 parts by weight of the acrylate resin. The solutions were then diluted to a solids content of 30% by weight by the addition of water. Clear lacquer film coatings were applied to glass plates, and the coated glass plates were baked in a circulating air drying cupboard for 30 minutes at 150° C. The thickness of the dried films was 30/μm.

The results of the tests for water resistance and pendulum hardness are entered in Table 3 below. The lacquers were found to have good levelling properties and a high gloss.

TABLE 3

| Example | Pendulum hardness (sec) | Water Test at 40° C. | | | | | | | | |
|---|---|---|---|---|---|---|---|---|---|---|
| | | 1h | 2h | 3h | 3h | 5h | 10h | 24h | 30h | 90h |
| 3 (a) | 142 | + | + | + | + | + | + | + | 0-1 | 0-1 |
| 3 (b) | 135 | + | + | + | + | + | + | + | + | + |
| 3 (c) | 133 | + | + | + | + | + | + | + | + | + |
| 3 (d) | 145 | + | + | + | + | + | + | + | + | 0 |

Comparison

A lacquer in which the carboxyl groups were neutralized with dimethylamino ethanol was prepared and used in place of one of the lacquers prepared according to the invention. The procedure was otherwise identical.

Although the films were glossy and had a pendulum hardness of 146 seconds, slight formation of bubbles (mark 1) was noted after 10 hours and severe formation of bubbles (mark 3) was noted after 90 hours, in the water test.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A water-dilutable lacquer based on carboxyl group containing alkyd or acrylate resins, wherein the carboxyl groups have been neutralized with an amine containing at least one 2,3-dihydroxy propyl group per amine nitrogen and having a boiling point above 200° C. at normal pressure.

2. The lacquer of claim 1 wherein the carboxyl groups have been neutralized with an amine containing from one to five 2,3-dihydroxy propyl groups per amine nitrogen.

3. The lacquer of claim 1 wherein the carboxyl groups have been neutralized with an amine containing from 1 to 4 amine nitrogen atoms per molecule and at least one 2,3-dihydroxy propyl group per amine nitrogen, and having a molecular weight of from 91 to 600.

4. The lacquer of claim 1 wherein the carboxyl groups have been neutralized with an amine containing at least one 2,3-dihydroxy propyl group per amine nitrogen which also contains alkyl groups or aryl groups having from 2 to 18 carbon atoms.

5. The lacquer of claim 1 wherein the carboxyl groups have been neutralized with an amine containing at least one 2,3-dihydroxy propyl group per amine nitrogen which also contains alkyl groups or aryl groups having from 2 to 18 carbon atoms and hydroxyl groups and/or ether groups in the molecule.

6. In a process for preparing water-dilutable lacquer systems from carboxyl group containing alkyd or acrylate resins by neutralizing the carboxyl groups,
the improvement which comprises using as a neutralizing agent an amine containing at least one 2,3-dihydroxy propyl group per amine nitrogen.

7. In a process of preparing a substrate with a lacquer film which comprises applying a water-dilutable lacquer coating to the substrate and then baking the thus coated substrate to obtain a baked resin coating,
the improvement which comprises applying a water-dilutable lacquer based on carboxyl group containing alkyd or acrylate resins wherein the carboxyl groups have been neutralized with an amine containing at least one 2,3-dihydroxy propyl group per amine nitrogen.

8. In a thermostable substrate having a lacquer film derived from a water-dilutable lacquer,
the improvement which comprises deriving the film from the water-dilutable lacquer of claim 1.

* * * * *